United States Patent [19]

Harris

[11] Patent Number: 4,600,438

[45] Date of Patent: Jul. 15, 1986

[54] CO-PRODUCTION OF CEMENTITIOUS PRODUCTS

[75] Inventor: Philip H. Harris, Arlington, Tex.

[73] Assignee: Texas Industries, Inc., Dallas, Tex.

[21] Appl. No.: 669,848

[22] Filed: Nov. 9, 1984

Related U.S. Application Data

[60] Division of Ser. No. 473,535, Mar. 9, 1983, abandoned, which is a continuation-in-part of Ser. No. 326,614, Dec. 2, 1981, abandoned.

[51] Int. Cl.$^4$ ............................................. C04B 7/44
[52] U.S. Cl. .................. 106/100; 106/103; 432/14
[58] Field of Search .............. 106/100, 103; 432/13, 432/14

[56] References Cited

U.S. PATENT DOCUMENTS

| | | | |
|---|---|---|---|
| 274,288 | 3/1883 | De Smedt | 106/100 |
| 811,902 | 2/1906 | Clark | 106/100 |
| 864,068 | 8/1907 | Bjerregaard | 106/100 |
| 1,567,934 | 12/1925 | Ferguson | 106/100 |
| 1,728,828 | 9/1929 | Hendricks | 106/100 |
| 1,916,716 | 7/1933 | Dahl et al. | 106/100 |
| 2,477,262 | 7/1949 | Mooser | 106/100 |
| 2,600,515 | 6/1952 | Mooser | 106/100 |
| 2,745,657 | 5/1956 | Oster | 263/53 |
| 2,871,113 | 3/1957 | Hammers | 48/192 |
| 3,437,329 | 4/1969 | Ostberg et al. | 263/53 |
| 3,589,920 | 6/1971 | Ostberg et al. | 106/100 |
| 3,622,363 | 11/1971 | Van Dornick | 106/100 |
| 3,759,730 | 4/1971 | Trief | 106/103 |
| 4,026,717 | 5/1977 | Harris et al. | 106/100 |
| 4,080,219 | 3/1978 | Pennell | 106/100 |
| 4,174,974 | 11/1979 | Fondriest | 106/103 |
| 4,217,143 | 8/1980 | Reich et al. | 106/100 |
| 4,265,671 | 5/1981 | Kroyer | 106/103 |
| 4,318,745 | 3/1982 | Kraus | 432/14 |
| 4,443,184 | 4/1984 | Bonnekamp et al. | 432/13 |
| 4,508,573 | 4/1985 | Harris | 106/100 |

FOREIGN PATENT DOCUMENTS

| | | | |
|---|---|---|---|
| 706318 | 3/1954 | United Kingdom | 432/14 |
| 1428680 | 3/1976 | United Kingdom | 432/14 |

Primary Examiner—William R. Dixon, Jr.
Assistant Examiner—Ann M. Knab
Attorney, Agent, or Firm—Richards, Harris, Medlock & Andrews

[57] ABSTRACT

A method and apparatus for thermally reacting one or more inorganic materials, the method involves the step of maintaining a flame in a combustion chamber at a predetermined reaction temperature by supplying a sufficient quantity of a hydrocarbon fuel and oxygen into the flame through a fluid stream, comminuting the inorganic material to be reacted to a particle size which can be transported by gas flow and suspending the comminuted inorganic compound in an intimate admixture with the fluid stream containing the hydrocarbon fuel and oxygen and passing the admixture to the interior of the flame to effect thermal reaction of the particulate inorganic material. The apparatus can comprise a blower, a grinding means, a furnace means, and a means for collecting the reacted material.

24 Claims, 3 Drawing Figures

CO-PRODUCTION OF CEMENTITIOUS PRODUCTS

This application is a divisional application of application Ser. No. 473,535 filed Mar. 9, 1983, now abandoned, which was a continuation-in-part of application Ser. No. 326,614, filed Dec. 2, 1981, now abandoned.

TECHNICAL FIELD

This invention relates to a method and apparatus for the reacting of one or more inorganic compounds by maintaining a flame in a combustion zone at a predetermined reaction temperature and feeding the materials to be reacted in a finely comminuted form and intimate admixture with a hydrocarbon fuel stream, and passing the admixed fuel and comminuted materials through the combustion zone. In particular, the invention relates to a method and apparatus for the manufacture of hydraulically reactive materials selected from pozzolanic materials, cementitious materials and admixtures thereof, while achieving reduction in emissions of sulfur containing contaminants.

BACKGROUND ART

The reaction of inorganic materials in the past has called for admixture of the materials in the reaction vessel followed by the application of heat. Many times this calls for a special design or steps during the reaction process to achieve adequate reaction products. One such product is Portland cement.

The prior art has seen many different approaches to the manufacture of cement, ranging from the earliest recorded history to modern day methods of manufacturing Portland cement as illustrative of the cementitious products. The conventional processes in this country for manufacturing cementitious products have generally comprised admixing predetermined portions of calcareous and argillaceous, or siliceous, materials. The materials may be admixed with water to form a slurry or may be dried to form a dry, raw meal. In any event, the admixture is continuously fed into and burned within a cement forming kiln to form clinker. The resulting clinker is mixed and pulverized with gypsum to form dry powdered modern day Portland cement.

The calcareous material may consist of limestone, marble, chalk, oyster shells and the like. The argillaceous material may consist of clay, shale, slate, slag, fly ash, sand and the like. The proportions of these ingredients in the mixtures determine the resulting chemical composition of the clinker and the finished cement. Additives may be blended with one or more of the mixtures to provide the characteristics for each predetermined type of cement for the final cementing job to be done. The different types of Portland cement are well recognized and defined by the American Society of Testing Materials (ASTM). The most commonly manufactured cement is known as Type 1, or general purpose cement. The remaining four types, Types II–V, are referred to as special purpose cements. These special purpose cements differ in the proportions of the respective ingredients and are usually manufactured in lesser quantities.

To try to provide the desirable features of manufacture; such as, those delineated hereinafter, a wide variety of artifices have been resorted to in the prior art. As noted in my U.S. Pat. No. 4,026,717, entitled "Economical, Finely Controlled Cement Production"; United States patents as early as 1883, illustrated by U.S. Pat. No. 274,288, have disclosed addition to fuel with argillo-calcareous raw materials for making cement. Many patents have issued since then with a similar idea of introducing calcareous material into the burning zone of a kiln and are typified by U.S. Pat. Nos. 1,728,828; 3,589,920. Patents such as U.S. Pat. No. 2,477,262 describe and claim the classic insufflation process. Patents such as U.S. Pat. Nos. 2,600,515 and 3,437,329 describe processes for operating a rotary cement kiln in which special additives are introduced into the burning zone of the kiln to provide the desired properties as they traverse upwardly through the kiln, meeting the downcoming admixture.

Other pertinent art includes U.S. Pat. No. 2,745,657 in which a solid, high ash fuel is burned in a special burner to produce a slag and then the burner is tapped off to withdraw the molten slag from the bottom.

Early patents such as U.S. Pat. No. 811,902 in 1906 show the use of tailings, of copper ore, for example, in a cement making process. U.S. Pat. No. 1,567,934 shows ore and cement making material smelted together to reduce the ore. U.S. Pat. No. 3,759,730 shows power station ash mixed with calcium carbonate and fired at 1300° C. (Centigrade or Celsius), then at 1500° C. and ground. U.S. Pat. No. 4,080,219 shows waste heat passed in heat exchange with wet materials for making cement.

One of the more pertinent modern patents in U.S. Pat. No 4,174,974 showing coal ash slag used to produce cement; for example, with calcium oxide. The primary thrust is, however, to increase the efficiency of a gasifier. U.S. Pat. No. 4,217,143 shows production of cement with calcium oxide, silica, and alumina ground to 200 mesh, dried to less than 5% water, blended and compounded in a high velocity mill. U.S. Pat. No. 4,265,671 shows cement clinker fed into the top and bottom of a rotary kiln to produce cement. Despite the wide variety of approaches tried, the prior art has not achieved and provided a plurality of desirable features such as those delineated hereinafter.

1. The method and apparatus should enable the use of less expensive fuels of a quality less than that currently demanded.
2. Ideally the method and apparatus should eliminate noxious contaminant automatically from such relatively inexpensive fuels without requiring expensive scrubbing towers or the like for removing sulfur-containing pollution gases.
3. The apparatus and method should significantly reduce the cost, as by eliminating the crushing and grinding costs at the product end of the process.
4. The method and apparatus can be used to reduce disposal costs for disposing of fly ash and modify the fly ash through a phase chemistry modification such that it produces a hydraulic fly ash or other cementitious products.
5. The apparatus and method should be flexible enough to enable manufacturing cements of different compositions readily without necessitating long periods of time to change over the operation of a kiln and related accessories and without requiring special purpose kilns.
6. Ideally the method and apparatus should provide the flexibility of operating this process in conjunction with another process, such as generation of electricity, and provide more than 100% trade off with value of any power lost as compared with the value of products produced.
7. The apparatus and method should provide the flexibility of being able to integrind clinker or the like from one boiler with fly ash or the like from another to provide any desired final cementitious product.
8. Finally, the method and apparatus should allay the tremendous problem of exceptionally large capital outlays for new kilns and accesories, such as employed in current modern day cement making plants.

As can be seen from the discussion of the prior art, none of the prior art provides the delineated advantages.

SUMMARY OF THE INVENTION

In one aspect, the present invention relates to a method for thermally reacting one or more inorganic materials. The method involves the step of maintaining a flame in a combustion chamber at a predetermined reaction temperature by supplying a sufficient quantity of a hydrocarbon fuel and oxygen into the flame through a fluid stream, comminuting the inorganic materials to be reacted to a particle size which can be transported by gas flow and suspending the comminuted inorganic compound in an intimate admixture with the fluid stream containing the hydrocarbon fuel such as coal, fuel oil, or natural gas, and oxygen and passing the admixture to the interior of the flame to effect thermal reaction of the particulate inorganic material. In a preferred embodiment, the inorganic material and fuel have a particle size of −100 mesh (U.S. sieve).

In accordance with a preferred embodiment of the present invention, a method is provided for manufacturing hydraulic reactive material by the reaction of inorganic reactant materials or mixtures thereof in a flame contained in a combustion zone maintained at a predetermined temperature. The temperature of the combustion zone is maintained by utilization of effective quantities of finely ground coal and oxygen containing gas. The inorganic reactant materials selected from calcareous, argillaceous, siliceous, aluminuous and ferruginous materials or mixtures thereof are finely ground and intimately admixed with finely ground coal. The intimate mixture is suspended in a stream of oxygen containing gas, the stream is passed through the interior of a flame and the coal contained in the stream is burned to maintain the predetermined temperature and to thermally react the finely ground inorganic reactant materials to form the hydraulically reactive product in particulate form. The gases and particulate hydraulically reactive material formed in the combustion zone are discharged from the combustion zone, and the reactive material is cooled and collected in the preferred embodiment. The reactive materials in the organic fuel are ground such that a major portion of the particles are of −100 mesh (U.S. sieve) in size. The flame temperature is maintained in a range from about 2400° to about 2800° F.

In accordance with another embodiment of the subject invention, a method is provided for reducing sulfur containing contaminants and emission gases from furnaces fired by finely ground coal or fuel oil suspended in an oxygen containing gas by intimately admixing with the finely ground coal a predetermined mixture of reactant materials selected from calcareous, aluminuous, siliceous, and ferruginous materials or admixtures thereof in a sufficient quantity to react with the sulfur and ash containing contaminants from the combustion to produce a solid reaction product.

According to another embodiment of the present invention, an apparatus is provided for the reaction of one or more finely ground inorganic reactants. The apparatus comprising a furnace with a means containing a nozzle for emitting particulate material suspended in an oxygen gas into a flame within the furnace, a means for discharging the expanding combustion gases containing suspended particulate material produced by the reaction from the furnace and a means for collecting said particulate material. Preferably a means is provided for producing and introducing the intimate admixture of coal and reactive materials within the gas stream which is a mill with a grinding table for said coal and inorganic reactant materials and a blower for blowing the admixture into an oxygen containing gas stream and into the nozzle of the furnace. Appropriate recycle can be provided. The hydraulic reactive products produced may be captured in a precipitator or the like for bagging or storage. The product may also be admixed with gypsum or other compounds to form a final desired product.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION

Figure 1:
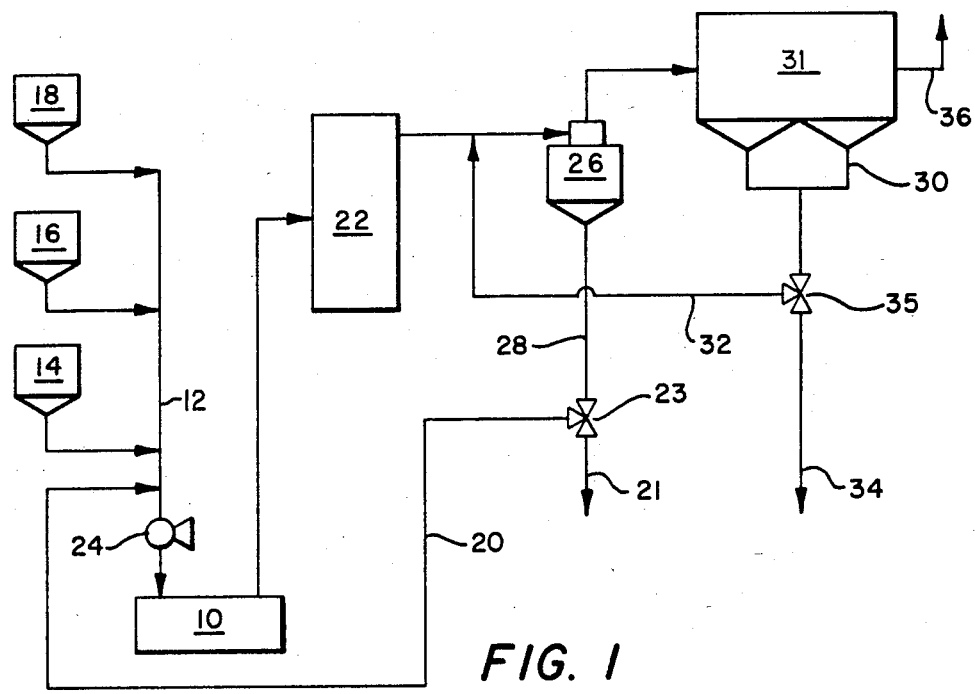
FIG. 1 is a schematic flow diagram illustrating the preferred embodiment of the present invention.

It will be apparent to those skilled in the art that the present invention is useful in the reaction of inorganic materials where the heating of said materials is necessary to drive the reaction. The method of the present invention will be of particular interest in those applications where the desired form of the product to be produced is in small particulate form. The present invention is particularly useful in the production of hydraulically reactive compounds. Thus, the preferred embodiment of the present invention involves the production of hydraulically reactive compounds and will be discussed with the understanding that other reactions can be accomplished by the same means.

As indicated hereinbefore, the prior art has attempted to convert and withdraw slag, or bottoms, from a furnace such as the fire box of the boiler to convert it into a cementitious product. Moreover, the fly ash that is captured out of the overhead, or effluent waste gases from the furnaces, have been subsequently treated, as by being employed in cement kilns or the like. In this invention, however, additives are incorporated with the coal feed into the furnace and are fired to incipient fusion to produce the cementitious product. Ordinarily, the closer the composition is to a general purpose cement or a calcium sulfoaluminate clinker, the better cementitious product will be deemed to have been produced. As is recognized in the art, a general purose cement clinker and calcium sulfo aluminate clinker may have a typical composition such as set out in Table I.

TABLE I

| Chemical Composition | CLINKER COMPOSITION | |
|---|---|---|
| | General Purpose Clinker Percent* | Sulfo Aluminate Clinker Percent |
| CaO | 67 | 56 |
| SiO$_2$ | 22 | 20 |
| Al$_2$O$_3$ | 6 | 11 |
| Fe$_2$O$_3$ | 3 | 2.5 |
| K$_2$O, Na$_2$O and MgO | 2 | 2.0 |
| SO$_3$ | — | 5.5 |

*percents herein are percents by weight unless otherwise indicated

The potential mineralogical compound compositions have been delineated in issued patents, such as U.S. Pat. No. 3,437,329, the descriptive matter of which is incorporated herein by reference for details that are omitted herefrom.

Table II hereinafter delineates a typical mineralogical compound make up of a general purpose clinker, and a sulfo aluminate clinker excluding magnesium oxide and alkali compounds.

TABLE II

| | Percent |
|---|---|
| General Purpose Clinker | |
| C$_3$S | 61.7 |
| C$_2$S | 16.7 |
| C$_3$A | 10.3 |
| C$_4$AF | 7.6 |
| Sulfoaluminate Clinker | |
| C$_4$A$_3\bar{S}$ | 16.9 |
| C$_6$A$_2$F | 11.00 |
| C$_3$S | 11.75 |
| C$_2$S | 49.5 |

In Table II and elsewhere herein, the conventional abbreviations that are employed are defined as follows:
C=CaO
S=SiO$_2$
A=Al$_2$O$_3$
F=Fe$_2$O$_3$
$\bar{S}$=SO$_3$ Also as recognized, the portion of di- and tri-calcium silicates, calcium aluminates and the like have to be controlled within a narrow chemical range to obtain a satisfactory cement. The cement clinker is susceptible to contamination by magnesium oxide or the like that may form periclase or other materials that are slow to hydrate and that impart undesirable properties to a setting cement. These chemicals, mineralogical compounds and their controls are delineated in numerous well known texts and publications that can be referred to for conventional details omitted herefrom. Typical of such text and publications are those listed in Table III.

Table III

KIRK-OTHMER ENCYCLOPEDIA OF CHEMICAL TECHNOLOGY
  Second edition, Anthony Standen, editor, Interscience Publishers, New York, 1969, volume on cements, pages 684–710.
THE CHEMISTRY OF CEMENT AND CONCRETE
  Third edition, F. M Lea, KT, C.B., C.B.E., D.SC., F.R.I.C., Formerly Director of Building Research, Chemical Publishing Co., Inc., New York, N.Y., First American Editor 1971, pages 134–135.
PROCEEDINGS OF THE THIRD INTERNATIONAL SYMPOSIUM ON THE CHEMISTRY OF CEMENT
  London 1952, Held under the auspices of the Building Research Station of the Department of Scientific and Industrial Research and the Cement and Concrete Association, Published by the Cement and Concrete Association, 52 Grosvenor Gardens, London SW1, Chapter 20, "The Influence of the Fineness of Cement Raw Mixes on Their Burnability", T. Heilmann, pages 711–749.
CHEMISTRY OF CEMENT
  Proceedings of the Fourth International Symposium Washington 1960, Volume I, Symposium held Oct. 2–7, 1960 at the National Bureau of Standards, Washington 25, D.C., proceedings published in two volumes, National Bureau of Standards Monograph 43—Vol. I, Issued Aug. 31, 1962, Paper II-S4. "Reactions of Coal Ash with Portland Cement Clinker During the Burning Process", T. Heilmann, pages 87–106.
PROCEEDINGS OF THE FIFTH INTERNATIONAL SYMPOSIUM ON THE CHEMISTRY OF CEMENT
  Tokyo, 1968, PART I CHEMISTRY OF CEMENT CLINKER (Vol. I), Symposium held Oct. 7–11, 1968 at the Tokyo Metropolitan Festival Hall, Tokyo, Proceedings published in 4 volumes Dec. 31, 1969, "On Kinetics of Cement Clinker Sintering", page 112 and "On Kinetics of Crystallization of Clinker Liquid Phase", page 113.
ROCK PRODUCTS, CEMENT TODAY
  A special section of May 1974 ROCK PRODUCTS, "Wet or Dry Process Kiln for Your New Installation?", Henning R. Norbom, pages 92–100, May 1974.
ROCK PRODUCTS
  "Blending of Raw Mix for Cement Manufacture, Part 2", J. B. Wilson & W. C. Durie, pages 60–62 and 68, April 1974, a Maclean-Hunter publication, Vol. 77, No. 4.
PIT & QUARRY, CEMENT INDUSTRY REPORTS
  105 West Adams Street, Chicago, Ill. 60603, "Roller Mills Have Found a Role", Raymond J. Krekel and Stanley L. Stiles, pages 93–98 and "utilization of Waste heat from Dry-Process Rotary Kilns", Dr. P. Weber, Polysius Corp., pages 115–122 and "Medusa's Georgia Plant Undergoes Major Changes-New Preheater Kiln, Roller Raw Mill System at Heart of Expansion and Conversion to Dry Process", B.C. "Sandy" Herod, pages 141–146, July 1974.

Table IV presents typical fly ash analyses from a variety of locations. These analyses represent the ash produced from burning coals obtained at different locations.

TABLE IV

| | FLY ASH ANALYSES | | | | | |
|---|---|---|---|---|---|---|
| | Locations | | | | | |
| | #1 | #2 | #3 | #4 | #5 | #6 |
| SiO$_2$ | 68.15 | 49.18 | 36.52 | 39.60 | 43.46 | 40.40 |
| Al$_2$O$_3$ | 19.80 | 23.68 | 21.16 | 21.82 | 35.90 | 17.30 |
| Fe$_2$O$_3$ | 3.20 | 2.68 | 4.56 | 5.68 | 11.00 | 29.40 |
| CaO | 1.33 | 18.40 | 26.58 | 20.96 | 2.20 | 6.30 |
| MgO | 0.19 | 3.52 | 4.56 | 3.86 | 1.45 | 0.81 |
| SO$_3$ | 0.19 | 1.23 | 1.95 | 1.85 | 2.31 | 1.50 |
| L.O.I.* | 0.18 | 0.21 | 0.31 | | 2.81 | 0.88 |
| Na$_2$O | 0.08 | — | 0.44 | 0.02 | — | 0.56 |

TABLE IV-continued

FLY ASH ANALYSES

|  | Locations | | | | | |
| --- | --- | --- | --- | --- | --- | --- |
|  | #1 | #2 | #3 | #4 | #5 | #6 |
| $K_2O$ | 0.64 | — | 0.42 | 0.28 | — | 2.20 |
| Total | 93.76 | 98.9 | 96.5 | 94.07 | 96.93 | 99.35 |
| unburned coal (carbon) | 5.96 | 1.1 | 3.5 | 5.93 | 3.07 | 0.65 |

*L.O.I. Lost on ignition

As can be seen, the fly ash is deficient in the calcium oxide ingredients supplied by the calcareous components in normal cement making operation. While there are large quantities of fly ash from power generating plants across the country, the fly ash is not ordinarily cementitious enough to be directly useful as a cementitious product. In most parts of the world, the constituents or ingredients of the cement clinker composition have to be admixed, or blended, before being fired in a cement making kiln to obtain a satisfactory final cement clinker as an example of a cementitious product. Ordinarily, the calcareous components and the argillaceous components are fed into the feed end of the kiln and formed into cement clinker during their two and a half to four and a half hour traverse longitudinally of the rotating kiln, encountering temperatures of up to 2600° F.-2800° F. (1426°-1538° C.). In many parts of the world, however, the limestone, marls and the like that include the calcareous component also include sufficient proportions of other materials to form a desired cement clinker composition with the constituents of the fly ash if they could be reacted.

For example, Table V shows an illustrative fly ash composition and an illustrative limestone composition and respective percent mixtures in the raw material and the final clinker formed by reacting in incipient fusion reactions the respective proportions of the ingredients. Table VA shows illustrative $C_4A_3\overline{S}$ cement composition.

TABLE V

|  | Fly Ash | Limestone | Proportions in Raw Material and Weight Percentages | | | Final Clinker Composition | | |
| --- | --- | --- | --- | --- | --- | --- | --- | --- |
|  |  |  | 30/70 | 25/75 | 20/80 | 30/70 | 25/75 | 20/80 |
| $SiO_2$ | 56.78 | 2.72 | 18.94 | 16.24 | 13.53 | 27.50 | 24.24 | 20.79 |
| $Al_2O_3$ | 20.43 | 0.57 | 6.53 | 5.54 | 4.54 | 9.48 | 8.27 | 6.97 |
| $Fe_2O_3$ | 3.37 | 0.21 | 1.16 | 1.00 | 0.48 | 1.68 | 1.49 | 1.29 |
| CaO | 11.01 | 53.69 | 40.89 | 43.02 | 45.15 | 59.37 | 64.20 | 69.37 |
| MgO | 1.79 | 0.29 | 0.74 | 0.67 | 0.59 | 1.07 | 1.00 | 0.91 |
| $SO_3$ | 0.63 | 0.01 | 0.20 | 0.17 | 0.13 | 0.29 | 0.25 | 0.20 |
| $Na_2O$ | 0.39 | 0.07 | 0.16 | 0.15 | 0.13 | 0.23 | 0.22 | 0.20 |
| $K_2O$ | 0.68 | 0.06 | 0.25 | 0.22 | 0.18 | 0.36 | 0.33 | 0.28 |
| L.O.I.* | 4.92 | 41.92 | 30.82 | 32.67 | 34.52 |  |  |  |
| (Total) |  |  | 99.69 | 99.68 | 99.61 |  |  |  |

*L.O.I. = lost on ignition

TABLE VA

| | Illustrative $C_4A_3\overline{S}$ Cement Composition | | | | |
| --- | --- | --- | --- | --- | --- |
| Components | Fly Ash Percent | Limestone I Percent | Limestone II Percent | Raw Mix** Percent | Final*** Clinker Percent |
| $SiO_2$ | 38.4 | 2.76 | 11.16 | 14.96 | 20.91 |
| $Al_2O_3$ | 16.62 | 0.65 | 3.16 | 5.89 | 8.24 |
| $Fe_2O_3$ | 5.54 | 0.19 | 1.47 | 2.03 | 2.83 |
| CaO | 15.58 | 53.28 | 46.59 | 40.77 | 56.98 |
| MgO | 2.04 | 0.73 | 0.6 | 1.10 | 1.54 |
| $SO_3$ | 21.07* | 0.08 | 0.26 | 6.41 | 8.96 |
| $Na_2O$ | 0.26 | 0 | 0.15 | 0.11 | 0.15 |
| $K_2O$ | 0.43 | 0.09 | 0.4 | 0.25 | 0.35 |
| L.O.I. | 0.11 | 42.18 | 36.02 | 28.45 |  |

*Accounts for total sulfur level of coal used.
**Raw mix is composed of 30% of fly ash, 52% of limestone I and 18% of limestone II.
***Final Clinker indicates the clinker composition one would expect upon processing of the raw mix in a standard kiln.

The prior art has recognized that at least the variables of temperature, residence time, size of particles, and intimacy of contact between the particles must be carefully controlled during the traversal of a kiln to obtain the desired satisfactory cement at the discharge end of the kiln.

This invention takes advantage of the inherent turbulence and fineness of fly ash particles coming out of the combustion zone of a furnace, as in a fire box of a boiler, to effect an advantageous product that has the desired sizes without further large expenditure of energy in comminution, separation and the like.

The hydrocarbon fuel can be any hydrocarbon fuel such as fuel oil, natural gas or coal. The preferred embodiment is illustrated herein with coal as the fuel. With proper adjustments in equipment, other types of hydrocarbon fuel may be used.

The apparatus useful in the present invention may be more clearly understood by reference to FIG. 1. In FIG. 1, a mill 10 is provided which is fed by line 12. Line 12 is fed by three storage chambers 14, 16, 18, and is also fed by recycle line 20. The number of storage chambers can vary with the number and type of reactant material to be used in the process. Lignite or bituminous coal is transferred from its storage chamber 14 to the mill. Also fed to mill 10 is argillaceous material from chamber 16 and calcareous material from chamber 18. Fly ash from a boiler 22 can be fed into the mill via recycle line 20. The feed to mill 10 should be finely ground such that the particles may be transported by a gas stream. In the preferred embodiment of the method, the majority of particles from the mill are sufficiently small enough to pass through a 100 mesh U.S. standard sieve screen. In the method of the present invention, it is necessary to feed coal to the burner to maintain the temperature. However, the feed, if any, of the calcareous or argillaceous material, fly ash recycle, or combination of them will depend on the product to be produced, as well as the composition of the coal utilized. The mill may be of any conventionally employed grinding apparatus, including roller mills, ball mills, high speed mills and the like with appropriate conveyors, particle separation, storage areas and handlers. The finely comminuted coal and reactant materials are entrained in a gas stream containing oxygen by blower 24 located in the feed line to mill 10. From mill 10 the admixed fuel and reactants are fed into the furnace 22 where the coal burns and the reaction product is formed. The reaction product is carried from the furnace 22 by the expanding gases into a suitable separation means 26, for example, a cyclone separator. The heavy articles exit through the line 28 and are available for recycle via line 20 or for expulsion or collection via line 21 depending upon the position of valve 23. The products from line 21 and line 34 may be utilized separately or admixed together. Those skilled in the art will recognize that more than one mill may be utilized. In some cases, it may be desirable, such as in old plants, to provide a separate mill or mills to grind the other feed components and provide a means to combine the finely ground coal with the other feed components prior to injection into the boiler. Those skilled in the art wll also recognize that in some cases it may not be necessary to have a separate means or to provide recycle.

The admixed coal and reactant materials are fed into the combustion zone of the furnace at a predetermined rate to maintain the desired temperature. The specific amounts of reactant materials are determined by the chemistry of the coal ash which is modified by reacting with the various raw materials combined with the feed coal such as calcareous material (limestone), siliceous material (sand), ferruginous material (such as iron ore) and alumina, for example, bauxite.

It is imperative that the coal and admixture of reactant materials be finely ground and intimately admixed before being blown into the combustion zone with the gas. When the method of the present invention is utilized to produce hydraulically reactive material, the burning of the coal produces a temperature in the combustion zone above about 2000° F. and preferably from about 2000° F. to about 3000° F. and more preferably between about 2400° F. to about 2800° F. In the combustion zone, there is an initial reaction of the reactant materials and coal to produce a hydraulic reactive material in fine particle size which is transported from the boiler with the stack gases as fly ash. It is surprising that hydraulically reactive material could be produced so rapidly and at the desired particle size by the method of the present invention. In contrast, the rotary kiln method would require from about 2.5 to 4.5 hours to produce a liquid slag stream that condenses in hard, large particles which are then reduced to a desired fineness with great expense and energy.

While this invention is not to be limited to the consequences of any theory, it is theorized that the siliceous material attains a molten state such that interaction with a calcareous material is a liquid/solid fusion reaction at high temperatures; and, consequently, the reaction is much more rapid than a solid state fusion reaction. Regardless of theory, the reaction produces a satisfactory hydraulically reactive composition even though the components have a much shorter reaction time than conventional processes. As will be explained below, the process of the subject invention can be utilized to produce both pozzolan or pozzolancially reactive materials and cementitious materials. As used herein, the term cementitious material means a particulate inorganic material which when mixed with water, forms a plastic mass and hardens by chemical combination, gelation and crystallization. Furthermore as used herein, the terms pozzolan or pozzolanically reactive materials means a particulate inorganic material that reacts chemically with calcium hydroxide in the presence of moisture at ordinary temperatures to form a cementitious composition.

Figure 2:
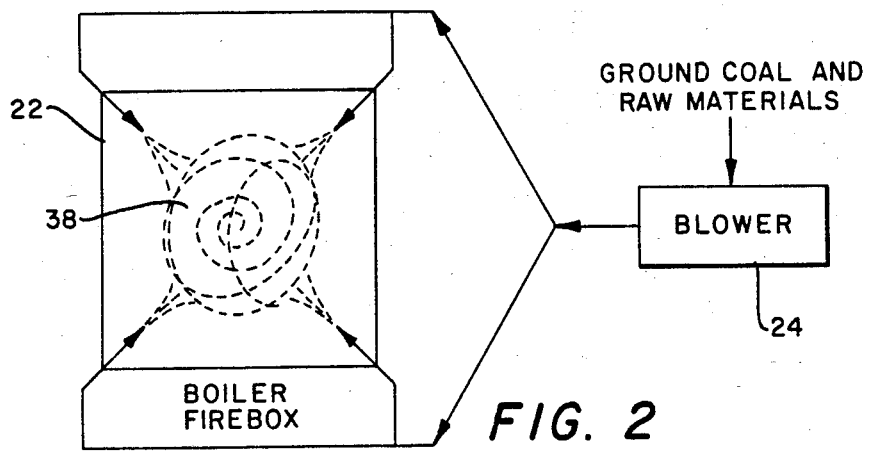
FIG. 2 is a plane view of the fire box of a boiler serving as a combustion zone of the furnace.

Regardless of the chemical mechanism, there is a reaction to a satisfactory cementitious product composition even though the components have a much shorter reaction time than in a conventional process for making cement. Specifically, the reactive materials go overhead and exit the furnace 22 of the boiler in the stack gas stream after they have been blown in from the corners of the fire box of furnace 22, as illustrated in FIG. 2. FIG. 2 illustrates a foiling flame 38 in which the desired cementitious fly ash is produced. The majority of reactive fly ash is carried from the furnace 22 by the stack gas flow as shown in FIG. 1. The reactive fly ash exits the boiler and is fed into a separator such as cyclone separator 26 where larger particles, those above about 100 mesh and preferably below 50 mesh (U.S. Sieve), are withdrawn and either recycled or discarded. The finer reaction products are fed into an electrostatic precipitator 31 where the fine particles of reactive fly ash are collected and removed from the stack gases. The collected reactive fly ash is withdrawn from the precipitator through line 30 and may be recycled via line 32 to the separator 26 or may be withdrawn via line 34 and bagged or sent to storage in silos, depending upon the positioning of flow control means 35. Usually, an additional step is introduced either before or after storage when producing cement. For example, to produce the desired hydraulically reactive material it may be necessary to admix the reactive fly ash product with a minor amount of gypsum. The term "gypsum" is used herein to mean all mineral forms of calcium sulfate, including the anhydrite. The gypsum can be ground to the desired fineness prior to combination with the reactive fly ash product or they may be ground together. The resulting fine powder is a cement composition which can be conveyed to appropriate storage silos.

The stack gases from which the particulates have been removed exit the precipitator 31 through a line 36 and are exhausted to the atmosphere.

A variety of methods for making general and special purpose cements are described in several publications; for example, in the aforementioned U.S. Pat. Nos. 3,437,329; 2,871,113; 1,916,716, and 864,068. Methods of making cement are also described in British Pat. Nos. 28,970 and 1,438 and in the articles presented in Table III above.

Another surprising characteristic of the present invention is the flexibility that it allows. Because the reaction rate is so rapid it is possible through the present invention to rapidly vary the compositions to be made, thus allowing suitable reactive fly ash products to be changed quickly depending upon the type of cement desired to be produced. This is a great advantage over the prior art where alteration of the cement composition required many hours of travel through the kiln such that a large quantity of intermediate product was produced complicating proper formulation of the desired end cement product. The proportion of reactants one to another can be varied to obtain the desired chemical formulation of the reaction product, e.g., to form a pozzolanically reactive material or a cementitious material. Thus, the present invention is highly useful by achieving rapid changeover.

Figure 3:
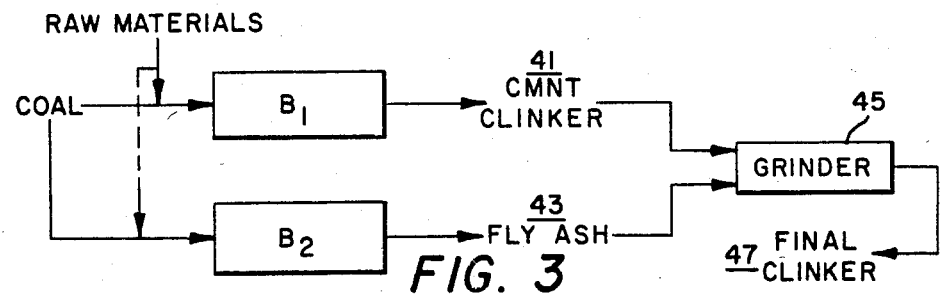
FIG. 3 is a schematic block diagram illustrating further flexibility of this invention.

For example, as shown in FIG. 3, the raw materials and the coal can be added to boiler $B_1$ to produce a cement clinker 41. The coal alone may be sent to boiler $B_2$, or the coal and a different proportion of raw materials or even different raw materials than fed to boiler $B_1$ can be sent to boiler $B_2$ to produce a fly ash 43 having a composition different from the cement clinker 41. The final products can then be intermixed, as in a high speed grinder or mixer 45 to produce a final clinker 47 having the desired final characteristics and composition of the cementitious product.

Surprisingly in addition to achieving a method suitable for the production of finely divided hydraulically reactive material, the present invention reduces the sulfur contaminant emissions in the stack gases without the need for limestone scrubbers. It was surprisingly discovered that the method of the present invention could achieve a 55% reduction in $SO_2$ emissions with a stochimetric feed ratio of CaO to $SO_2$ of approximately 2.9 or less; whereas, the prior art indicated that stochiometric ratios of from three to four were necessary to achieve about a 40% reduction in $SO_2$ emission.

While the inventor does not wish to be bound to any particular theory, it is believed that when practicing the method of the subject invention, cement forms in three stages which depend upon flame temperature and the temperature-time profile for formation. The products produced in these stages have different characteristics. Stage 1 is characterized by the production of quartzite fly ash with a specific gravity of from about 2.5 to 2.7 grams per cc and more particularly from about 2.6 to about 2.65. This stage is characterized by high pozzolanic activity when the fly ash alone is tested in accordance with ASTM C109.

Stage 2 produces gehlenite and akermanite which are commonly referred to as Melilites. The second stage is characterized by fly ash with a specific gravity in the range of from about 2.8 to about 2.9 and more particularly from about 2.8 to about 2.85 grams per cc. The products of this stage have high pozzolanic reactivity in the presence of Portland cement and produce high early strength when tested in accordance with ASTM C109.

Thus surprisingly, the present invention produces a hydraulically reactive fly ash product which can be incorporated into Portland cement without sacrifice of early high strength.

Stage 3 produces calcium silicates and calcium aluminates or $C_4A_3\bar{S}$ of the type contained in Portland cement. This stage can be detected by the fly ash having a specific gravity in excess of 2.85 grams per cc and the material being hydraulic alone or in the presence of Portland cement.

More specifically, it appears that the kinetics of the physical and chemical reactions involved in this invention appear to be favorably affected by two criteria:

1. The reactants are physically separate although in close proximity to each other in the gas stream until the coal begins to burn. The ash melts rapidly as the flame temperature rises, producing droplets of molten ash. These droplets are impregnated by particles of CaO and $CaCO_3$ produced by explosive decrepitation and calcination of the limestone in the flame. This produces many potential solid/liquid interface sites for chemical reactions to proceed.

2. Depending upon flame temperature and the temperature-time profile, physical mixtures of active $SiO_2$ and soft burned CaO are first formed, proceeding to the production of Melilite compounds at the interaction sites upon longer exposure, and finally, depending upon the sulphur oxide content of the gas stream producing $C_4A_3\bar{S}$ type compounds ($S=SO_3$) together with lime aluminoferrites.

The Stage 1 process can be characterized by:

A. The production of a Quartzite by heat treatment of the ash and any siliceous additives.

B. Calcination of the limestone to produce a soft burned and highly reactive quicklime (CaO).

C. When an oxidizing atmosphere is available, combination of any sulphur oxides present with CaO to produce calcium sulfates.

D. Production of lime aluminates and solid solutions of the lime alumina ferrite series, depending on the quantities of alumina and iron oxides present in the ash and additives. These compounds will appear as glasses.

The Stage 2 process can be characterized by:

A. The production of molten droplets of fly ash.

B. The explosive decrepitation of the limestone due to the very severe temperature gradient in the flame, the production of CaO from the limestone calcination.

C. The impregnation of the molten ash droplets by fragments of lime and limestone producing many potential solid/liquid interface chemical sites.

D. The production of gehlenite ($C_2AS$) and akermanite ($C_2MS_2$) [from any magnesia (M=MgO) present in the limestone] and solid solutions of these compounds called Melilites. These solid solutions are glasses.

E. The production of lime aluminoferrit glasses in the $C_4AF$-$C_6A_2F$ series.

The Stage 3 process can be characterized by:

A. All of the steps shown in Stages 1 and 2.

B. Followed by a progressive breakdown of the Melilite series as temperature increases and the replacement of them by $C_2S$, $C_3S$ or $C_4A_3\bar{S}$ depending upon the amount of sulphur oxides present in the gas stream.

C. The decomposition of intermediately formed calcium sulfate in favor of the production of $C_4A_3\bar{S}$.

EXAMPLES

The following examples are presented to exemplify and illustrate the present invention to those of ordinary skill in the art and are not intended to limit the subject matter in any manner.

EXAMPLE 1

The effectiveness of the method of the present invention is demonstrated by a comparison in the $SO_2$ reduction achieved by the present method with the $SO_2$ reduction achieved in tests conducted in a commercial coal fired boiler.

In these tests, ground lime was injected separately into a test boiler. All lime utilized was ground so that 100% would pass through a 200 mesh screen. The furnaces were operated at 1800° F. and the location of the injection ports for lime was varied. A maximum $SO_2$ reduction of 16% was achieved at 1.2 stoichiometric ratio (1.05 pounds CaO per pound of $SO_2$) Results of this test are recorded in Table VI.

TABLE VI

| Commercial Boiler Test, 2 March 1979 | | | |
|---|---|---|---|
| Stoichiometric feed ratio of lime to $SO_2$ | lbs. CaO/ lbs. $SO_2$ | % $SO_2$ reduction | Injection points* |
| 0.6 | 0.53 | 0 | I |
| 0.9 | 0.79 | 10.7 | I |
| 1.2 | 1.05 | 9.1 | I |
| 1.2 | 1.05 | 16.9 | II |
| 1.2 | 1.05 | 6.1 | III |
| 0.9 | 0.79 | 7.9 | II |

*Configurations I, II and III are three different injection port arrangements in the interior of a generally square cross section of the boiler. In Configuration I, two of the injection ports for the lime are located on the front wall spaced in from the corner and two side ports are placed so that there is one on each of the sidewalls. In Configuration II, the two ports on the front wall are located at the corner where the front wall and sidewalls meet, two side ports are provided as in Configuration I. In Configuration III, the four ports are located two on each sidewall adjacent to one another.

Further testing conducted in the commercial boiler tested various methods of adding lime and limestone injection to reduce $SO_2$ emissions. The following test did not produce any measurable $SO_2$ reduction: limestone was mixed with lignite at 250°–300° F. in the burner fuel elbow and injected into the combustion zone. Furnace temperatures were 1800° to 2300° F., with excess air at approximately 20%. Two test were conducted, one for 1-½ hours and the other for 6 hours, neither of which produced any measurable reduction in $SO_2$ levels.

Further tests were conducted at the Department of Energy's Lignite Research Facility, in Grand Forks, North Dakota with the CaO containing material injected directly into the boiler as shown in Table VII. These tests demonstated that the efficiency was independent of whether the limestone was 100 mesh or 200 mesh. The optimum temperature range was found to be from 1800° F. to 2400° F.

TABLE VII

| D.O.E. GRAND FORKS, N.D. | | | | | |
|---|---|---|---|---|---|
| CaO type | Stoichiometric ratio of lime to $SO_2$ | lbs. $CaO_2$ per lbs. $SO_2$ | % Reduction $SO_2$ | Mesh size lime | temperature |
| Texas limestone | 1.0 | 0.875 | 24 | −100 | approx. 2400° |
| Dolomite | 1.0 | 0.875 | 18 | −100 | approx. 2400° |
| Texas lime | 0.5 | 0.44 | 20 | −100 | approx. 2400° |
| Texas lime | 2.0 | 1.75 | 35 | −100 | approx. 2400° |
| Texas lime | 1.0 | 0.875 | 25 | −100 | 1800° F. |
| Texas limestone | 1.0 | 0.875 | 32 | −100 | 1800° F. |
| Canada limestone | 1.0 | 0.875 | 30 | −100 | 1800° F. |
| Dolomite | 1.0 | 0.875 | 28 | −100 | 1800° F. |
| Texas lime | 1.0 | 0.875 | 36 | −200 | 1800° F. |
| Texas lime | 1.0 | 0.875 | 31 | −100 | 1800° F. |
| Canada limestone | 1.0 | 0.875 | 30 | −200 | 1800° F. |
| Texas lime | 1.0* | 0.875 | 24 | −200 | 1800° F. |
| Texas lime | 2.0* | 1.75 | 37 | −200 | 1800° F. |
| Texas lime | 1.0 | 0.875 | 15 | −200 | 1200° F. |

*Stoichiometric ratio increased from 1 to 2.0

The method of the present invention was tested by using −200 mesh (U.S.) limestone, that is, 70% passing through a 200 U.S. mesh screen. The coal and limestone were admixed and injected into the burner through a common opening. The furnace temperature was approximately 2450° to 2500° F. The amount of excess oxygen to the furnace was about 5%. The reduction in $SO_2$ emissions achieved with the method of the present invention are recorded in Table VIII.

TABLE VIII

| TESTS OF THE METHOD OF PRESENT INVENTION | | |
|---|---|---|
| Stoichiometric Ratio of $CaO/SO_2$ | lbs. CaO/ lbs. $SO_2$ | % $SO_2$ Reduction |
| 1.02 | 0.90 | 12 |
| 0.86 | 0.75 | 12 |
| 0.61 | 0.53 | 12 |
| 1.21 | 1.06 | 19 |
| 0.90 | 0.79 | 23 |
| 1.12 | 0.98 | 24 |
| 1.39 | 1.22 | 25 |
| 0.99 | 0.87 | 27 |
| 1.81 | 1.58 | 27 |
| 1.81 | 1.58 | 28 |
| 1.42 | 1.24 | 30 |
| 2.51 | 2.20 | 38 |
| 2.03 | 1.78 | 40 |
| 2.33 | 2.04 | 40 |
| 3.27 | 2.86 | 43.5 |
| 2.01 | 1.76 | 45 |
| 3.00 | 2.63 | 47 |
| 3.00 | 2.63 | 52 |

EXAMPLE 2

This example illustrates the difference between the Stage 1 and Stage 2 products. The strength of a control Portland cement composition is compared with the strength of a fly ash-cement mixture. In Table IX, the fly ash-cement mixture was 40% fly ash and 60% cement. In Table X, the admixture of reactive fly ash and cement was 25% fly ash and 75% cement. Table IX records the strength ratio of the control to the 40% fly ash product versus total percent silicates in the cement on a calculated basis. It will be observed that the early strength of Stage 1 products is greatly affected by the percent of silicates present whereas the comparative strengths of Stage 2 products are relatively independent of silicate concentration at 3 and 7 days and show an optimal range at about 55% to about 62% silicates. Table X data demonstrates similar phenomena.

The data in Tables IX or X also permits a comparison of the strengths as affected by alumina and silicate concentrations. Comparison of the strength ratios against the percent alumina and silicate demonstrates that the Stage 1 product is highly dependant upon the particular percentages of alumina and silicates present. In contrast, the Stage 2 product is relatively independent of the percent of alumina or silicates thereby producing a more consistent cement and one which has a wider range of quality control possibilities. All strength tests were measured according to ASTM C-109.

The fly ash compositions of Tables IX and X were produced by inter-grinding coal and additives such a limestone to −100 mesh U.S. Standard and substantially all of the admixture was ground to minus −325 mesh. The ground admixture of coal and additives was then blown into the boiler in an air stream with a volume of excess air. The fly ash of Table IX was produced in a small thermal reactor operated at about 2400° F. with a residence time of about one second.

The fly ash of Table X was produced in a commercial boiler of 50,000 pounds/hour of steam capacity utilizing excess oxygen in the above about 5%. The interground fuel-additive admixture was fed into the fire box of the boiler through ports located on the front wall.

The temperature of the combustion zone was in the range of from about 2300° F. to about 2550° F. at the front of the furnace and from about 1950° F. to 2300° F. at the rear of the furnace. The residence time in th furnace was about 2.4 seconds.

Table XI gives a detailed analysis of the control and fly ash compositions used in formulating the mixture tested. For example, the analysis under the numbered samples is an analysis of the fly ash used and not the admixture of fly ash with cement.

Table XII sets forth the strength ratios obtained with 34% fly ash-66% cement admixture where the fly ash was not produced in accordance with the present invention. The fly ash composition was the same for each admixture. A comparison of tables IX and X and XI will illustrate the high early strengths of the cement mixture made with the fly ash composition of the subject invention as compared to conventional fly ash cement blends.

TABLE IX

EARLY STRENGTHS FOR REACTIVE FLY ASH-CEMENT MIXTURES FOR STAGE I AND II PRODUCTS

|  | Control | 1 | 2 | 3 | 4 | 5 | 6 | 7 | 8 | 9 |
|---|---|---|---|---|---|---|---|---|---|---|
| −325 M[1] | 90.4 | 87.1 | 91.1 | 93.2 | 92 | 93.2 | 95.2 | 85.2 | 98.1 | 97.9 |
| Blaine | 3471 | 6019 | 5622 | 4016 | 3886 | 4232 | 4983 | 6436 | 4309 | 4552 |
| Sp. Grav.[2] |  | 2.6 | 2.58 | 2.68 | 2.64 | 2.85 | 2.84 | 2.86 | 2.8 | 2.84 |
| Flow 46% |  | 99 | 108 | 134 | 122 | 130 | 134 | 108 | 138 | 140 |
| 3 Day Str.* | 3500 | 3925 | 3024 | 2738 | 3138 | 3388 | 3463 | 3575 | 3675 | 3650 |
| 7 Day Str.* | 4725 | 5488 | 4025 | 3613 | 4250 | 4450 | 4300 | 4500 | 4700 | 4525 |
| 28 Day Str.* | 5863 | 7150 | 5775 | 5975 | 7000 | 6250 | 5775 | 5800 | 7350 | 7400 |
| 3 D Ratio** |  | 1.12 | 0.86 | 0.78 | 0.90 | 0.97 | 0.99 | 1.02 | 1.05 | 1.04 |
| 7 D Ratio** |  | 1.16 | 0.85 | 0.76 | 0.90 | 0.94 | 0.91 | 0.95 | 0.99 | 0.96 |
| 28 D Ratio** |  | 1.22 | 0.98 | 1.02 | 1.19 | 1.07 | 0.98 | 0.99 | 1.25 | 1.26 |
| Total Silicates[3] |  | 65.60 | 46.00 | 36.78 | 44.02 | 42.87 | 66.44 | 83.69 | 54.93 | 60.78 |
| $Al_2O_3$[4] |  | 8.93 | 13.60 | 14.21 | 15.84 | 12.60 | 8.92 | 4.63 | 12.61 | 10.90 |

[1]This line is % of reactive fly ash product (except control) which would pass through a 325 mesh U.S. Sieve.
[2]Specific gravity in grams/cc.
*Strength at number of indicated days in p.s.i.
**3 D, 7 D and 28 D ratios represent strength ratio of test composition to control at 3 days, 7 days, and 28 days.
[3]Total silicates indicates total silicates calculated.
[4]Weight % $Al_2O_3$ calculated.

TABLE X

EARLY STRENGTH DATA FOR REACTIVE FLY AT 25% FLY ASH - 75% CONTROL MIXTURE

|  | Control | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|
| −325 M[1] | 87 | 88.8 | 90.4 | 90.3 | 90.6 | 91.6 | 89.6 | 90.9 | 90.8 | 90.1 | 90.7 | 91. | 90.8 | 90.2 | 91.2 | 90.7 |
| Blaine | 3264 | 5092 | 3753 | — | — | — | — | — | 4508 | — | 4663 | 4229 | 4676 | 4278 | 4163 | 4740 |
| Sp. Grav.[2] | — | 2.66 | 2.57 | 2.68 | 2.68 | 2.57 | 2.56 | 2.62 | 2.77 | 2.76 | 2.72 | 2.77 | 2.8 | 2.94 | 2.82 | 2.72 |
| 3 Day Str.* | 3183 | 2525 | 2305 | 2808 | 2667 | 2725 | 2217 | 2175 | 2692 | 2708 | 2917 | 2858 | 2950 | 2842 | 2362 | 2775 |
| 7 Day Str.* | 4050 | 3392 | 3158 | 2417 | 3408 | 3367 | 2750 | 2867 | 3708 | 3725 | 3800 | 3667 | 3933 | 3825 | 3867 | 3633 |
| 28 Day Str.* | 5742 | 4467 | 4542 | 5033 | 4792 | 4983 | 0 | 0 | 5067 | 5208 | 5283 | 5333 | 6033 | 5350 | 5300 | 5167 |
| 3 D Ratio** |  | 0.79 | 0.72 | 0.88 | 0.84 | 0.86 | 0.70 | 0.68 | 0.85 | 0.85 | 0.92 | 0.90 | 0.93 | 0.89 | 0.74 | 0.87 |
| 7 D Ratio** |  | 0.84 | 0.78 | 0.60 | 0.84 | 0.83 | 0.68 | 0.71 | 0.92 | 0.92 | 0.94 | 0.91 | 0.97 | 0.94 | 0.95 | 0.90 |
| 28 D Ratio** |  | 0.78 | 0.79 | 0.88 | 0.83 | 0.87 | 0 | 0 | 0.88 | 0.91 | 0.92 | 0.93 | 1.05 | 0.93 | 0.92 | 0.90 |
| Total Silicates[3] |  | 37.62 | 28.16 | 32.71 | 38.79 | 26.18 | 15.06 | 30.62 | 46.41 | 42.46 | 37.87 | 41.61 | 26.02 | 31.79 | 37.79 | 33.52 |
| Total $Al_2O_3$[4] |  | 10.49 | 14.46 | 11.93 | 15.80 | 18.91 | 21.02 | 15.16 | 10.45 | 11.32 | 13.05 | 12.63 | 17.60 | 16.92 | 12.76 | 13.06 |

[1]This line is % of reactive fly ash product (except control) which would pass through a 325 mesh U.S. Sieve.
[2]Specific gravity in grams/cc.
*Strength at number of indicated days in p.s.i.
**3 D, 7 D and 28 D ratios represent strength ratio of test composition to control at 3 days, 7 days, and 28 days.
[3]Total silicates indicates total silicates calculated.
[4]Weight % $Al_2O_3$ calculated.

TABLE XI

COMPLETE ANALYSIS OF FLY ASHES UTILIZED IN THE EXAMPLES OF TABLES IX AND X

| | | Table IX Cement | | | | | | | | |
|---|---|---|---|---|---|---|---|---|---|---|
| Example | Control | 1 | 2 | 3 | 4 | 5 | 6 | 7 | 8 | 9 |
| $SiO_2$ | 21.2 | 20.64 | 18.06 | 31.28 | 37.5 | 17.76 | 17.48 | 9.92 | 29.46 | 24.8 |
| $Al_2O_3$ | 4.8 | 8 | 11.9 | 13.7 | 14.9 | 12.4 | 8.45 | 4.2 | 12 | 10.35 |
| $Fe_2O_3$ | 3.1 | 2.96 | 6.47 | 4.47 | 5.39 | 7.6 | 2.67 | 1.17 | 4.11 | 3.53 |

TABLE XI-continued

COMPLETE ANALYSIS OF FLY ASHES UTILIZED IN THE EXAMPLES OF TABLES IX AND X

| | | | | | | | | | | |
|---|---|---|---|---|---|---|---|---|---|---|
| CaO | 65.3 | 52.33 | 44.08 | 28.36 | 30.38 | 47.54 | 60.27 | 73.34 | 44.01 | 51.21 |
| MgO | .8 | 1.25 | 1.21 | 1.95 | 2.4 | 1.14 | 1.31 | .79 | 1.86 | 1.53 |
| $SO_3$ | 2.9 | 3.71 | 4.08 | 15.78 | 2.8 | 9.86 | 3.81 | .95 | 2.97 | 2.91 |
| $Na_2O$ | 0 | .22 | 1.34 | .33 | .29 | 1.7 | .34 | .16 | .24 | .23 |
| $K_2O$ | .44 | 0.49 | .36 | .55 | .4 | .41 | .38 | .28 | .48 | .42 |
| L.O.I. | .8 | 9.13 | 7.6 | 3.43 | 2.17 | 3.22 | 2.63 | 6.33 | 1 | .86 |
| TOTAL | 99.34 | 98.73 | 95.10 | 99.85 | 96.23 | 0.63 | 97.34 | 97.14 | 96.13 | 95.84 |

Table X Cement

| Example | Control | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|
| $SiO_2$ | 21.2 | 18.06 | 25.94 | 24.46 | 31.04 | 34.74 | 31.04 | 26.9 | 18.8 | 18.22 | 24.94 | 25 | 24.84 | 23.76 | 19.84 |
| $Al_2O_3$ | 4.8 | 8.75 | 13.33 | 10.64 | 15.28 | 17.85 | 19.04 | 14.05 | 9.47 | 10.37 | 11.72 | 11.62 | 16.5 | 16.32 | 12.17 |
| $Fe_2O_3$ | 3.1 | 14.55 | 15.65 | 17.25 | 8 | 11.1 | 12.15 | 13.85 | 9.85 | 10.05 | 11.6 | 10 | 11.1 | 8.55 | 10.45 |
| CaO | 65.3 | 32.85 | 27.52 | 28.31 | 34.49 | 23.34 | 18.32 | 29.52 | 42.3 | 41.3 | 32.48 | 36.88 | 30.68 | 36.84 | 39.95 |
| MgO | .8 | 2.15 | 2 | .82 | 1.38 | 1.37 | 6.70 | 2.75 | 2.95 | 3 | 2.45 | 2.45 | 2.2 | 2.5 | 2.75 |
| $SO_3$ | 2.9 | 6.29 | 6.18 | 6.02 | 5.6 | 4.85 | 2.21 | 4.55 | 6.47 | 7.96 | 5.73 | 5.3 | 7.17 | 7.45 | 9.11 |
| $Na_2O$ | 0 | .28 | .33 | .33 | .27 | .3 | .32 | .24 | .25 | .22 | .26 | .26 | .33 | .36 | .27 |
| $K_2O$ | .44 | 0.47 | 1.25 | 1.32 | .64 | .83 | .81 | .8 | .5 | .5 | .64 | .5 | .91 | .69 | .86 |
| L.O.I. | .8 | 14.20 | 7 | 10.23 | 2.45 | 5.29 | 7.9 | 6.38 | 8.34 | 8.64 | 9.9 | 6.48 | 5.88 | 3.3 | 3.51 |
| TOTAL | 99.34 | 97.60 | 99.20 | 99.38 | 99.15 | 99.67 | 98.49 | 99.04 | 98.93 | 100.26 | 99.72 | 98.49 | 99.61 | 99.77 | 98.91 |

TABLE XII

STRENGTH TESTS FOR 34% FLY ASH - 66% CEMENT MIXTURES WITH STANDARD FLY ASH

| Example Composition | Cement Control | Fly Ash | Example Strength | Control | A | B | C | D |
|---|---|---|---|---|---|---|---|---|
| $SiO_2$ | 20.5 | 39.3 | 3 Days | 2342 | 1609 | 2306 | 1631 | 2398 |
| $Al_2O_3$ | 5.2 | 21.0 | 7 Days | 3130 | 2370 | 2848 | 2370 | 3272 |
| $Fe_2O_3$ | 2.7 | 5.01 | 28 Days | 4227 | 3891 | 4422 | 3820 | 4616 |
| CaO | 64.9 | 21.98 | 3 D Ratio | | 0.68 | 0.98 | 0.70 | 1.02 |
| MgO | 1.0 | 3.44 | 7 D Ratio | | 0.76 | 0.91 | 0.76 | 1.05 |
| $SO_3$ | 3.0 | 1.10 | 28 D Ratio | | 0.92 | 1.05 | 0.90 | 1.09 |
| $P_2O_5$ | 0.08 | — | | | | | | |
| $TiO_2$ | 0.23 | 1.62 | | | | | | |
| $CiO_2$ | 0.01 | 0.01 | | | | | | |
| $MnO_2$ | 0.06 | 0.02 | | | | | | |
| $K_2O$ | 0.57 | 0.57 | | | | | | |
| TOTAL | 98.25 | 94.05 | | | | | | |

While the invention has been described in relation to its preferred embodiments, it is to be understood that the various modifications thereof will be apparent to those of ordinary skill in the art upon reading the specification and it is intended to cover all such modifications as fall within the scope of the appended claims.

I claim:

1. A method of thermally reacting one or more inorganic materials at a predetermined reaction temperature comprising:
    (a) maintaining a flame in a combustion zone at said predetermined reaction temperature by passing effective combustion quantities of a fluid stream comprising a hydrocarbon fuel and oxygen into said flame;
    (b) comminuting said inorganic materials to a predetermined particle size sufficient to be transported by gas flow; and
    (c) suspending said comminuted particles of said inorganic compounds in intimate contact with said hydrocarbon fuel and said oxygen within said fluid stream, and passing said fluid stream to the interior of said flame to thereby effect said thermal reaction of said particulate inorganic material therewithin.

2. The method of claim 1 wherein said inorganic material is selected from calcareous materials, siliceous materials, aluminous materials, ferruginous materials, and argillaceous materials, and mixtures thereof.

3. The method of claim 2 wherein said hydrocarbon fuel is selected from the group consisting of comminuted coal, coke, fuel oil and hydrocarbon gas.

4. The method of claim 3 wherein said particulate inorganic material and said comminuted coal have a particle size of −100 mesh (U.S. Sieve).

5. The method of claim 4 wherein said thermal reaction forms a pozzolanically reactive material.

6. The method of claim 5 wherein said pozzolanically reactive material comprises quartzite.

7. The method of claim 5 wherein said pozzolanically reactive material comprises melilites and other glasses containing C, A and S.

8. The method of claim 4 wherein said thermal reaction forms a cementitious composition.

9. The method of claim 8 wherein said cementitious composition comprises a calcium silicate.

10. The method of claim 8 wherein said coal contains sulfur and said cementitious composition comprises a calcium aluminosulfate.

11. A method of manufacturing hydraulically reactive materials selected from pozzolanic and cementitious materials and mixtures thereof in a flame in a combustion zone maintained at a selected predetermined temperature by effective quantities of finely ground coal and an oxygen containing gas comprising:
    (a) intimately admixing said finely ground coal with finely ground inorganic reactant materials selected from calcareous, argillaceous, siliceous, aluminous and ferruginous materials and mixtures thereof in predetermined quantities;

(b) suspending said intimate mixture within a stream of oxygen containing gas;

(c) passing said stream of gas containing said intimate mixture to the interior of said flame and burning said coal to maintain said predetermined temperature and to thermally react said finely ground inorganic reactant materials to form said reactive materials in particulate form in gases formed from said combustion; and (d) discharging said gases formed from said combustion and said particulate reactive materials from said combustion zone, cooling said materials at a predetermined rate and collecting said particulate reactive material.

12. The method of claim 11 wherein said finely ground coal or coke and said finely ground inorganic reactant materials have a major portion of particles of size of −100 mesh (U.S. Sieve).

13. The method of claim 12 wherein said inorganic reactant materials have a major portion of particles of a size of −200 mesh (U.S. Sieve).

14. The method of claim 13 wherein said predetermined temperature of said flame is at least about 2000° F.

15. The method of claim 14 wherein said predetermined temperature is in the range of from about 2000° to about 3000° F.

16. The method of claim 15 wherein said predetermined temperature is in the range of from about 2400 to about 2800 degrees F.

17. The method of claim 14 wherein said reactive material is a pozzolanic material and said inorganic reactant materials are present in predetermined quantities within said intimate mixture to modify the chemical oxide analysis of the coal ash when said coal is burned to a coal ash, such that the chemical analysis of said coal ash is modified so as to form said pozzolanic material.

18. The method of claim 14 wherein said reactive material is a cementitious material and said inorganic reactant materials are present in predetermined quantities within said intimate mixture to modify the chemical oxide analysis of coal ash when said coal is burned to a coal ash, such that the chemical analysis of said coal ash is modified so as to form said cementitious material.

19. The method of claim 17 wherein said coal contains sulfur and further comprising supplying sufficient alkaline earth metal material in the form of said inorganic reactant material to react with sulfur oxides formed by burning said coal.

20. The method of claim 11 wherein said reactive material is a cementitious material and said inorganic reactant materials in intimate mixture with said coal are present in proportions necessary to modify the chemical oxide analysis of the coal ash when said coal is burned to a coal ash such that the chemical analysis of said coal ash is modified to form said cementitious material.

21. The method of claim 20 wherein said coal contains sulfur and sufficient quantities of alkaline earth metal materials are present in said inorganic reactant material to react with sulfur oxides formed by burning said coal.

22. A method of manufacturing reactive cementitious materials in a flame in a combustion zone maintained at a selected predetermined temperature by effective quantities of finely ground coal and an oxygen containing gas comprising:

(a) intimately admixing finely ground coal with finely ground inorganic calcareous and argillaceous materials in predetermined quantities sufficient to produce a reactive cementitious product;

(b) suspending said intimate mixture within a stream of oxygen containing gas;

(c) passing said stream of gas containing said intimate mixture to the interior of said flame and burning said coal to maintain said predetermined temperature and to thermally react said finely ground inorganic reactant materials to form said reactive cementitious materials in particulate form in gases formed from said combustion; and (d) discharging said gases formed from said combustion and said particulate cementitious reactive materials from said combustion zone, cooling said materials at a predetermined rate and collecting said particulate reactive cementitious material.

23. The method of claim 22 wherein said inorganic reactant materials have a major portion of particles of a size of −100 mesh (U.S. Sieve).

24. The method of claim 23 wherein said predetermined temperature is in the range of from about 2400° to about 2800° F.

* * * * *

UNITED STATES PATENT AND TRADEMARK OFFICE
CERTIFICATE OF CORRECTION

PATENT NO.   :   4,600,438
DATED        :   July 15, 1986
INVENTOR(S)  :   Philip H. Harris It is certified that error appears in the above-identified patent and that said Letters Patent is hereby corrected as shown below:

Column 2, line 46, change "contaminant" to --contaminants--.

Column 4, line 66, change "purose" to --purpose--.

Column 11, line 27, change "stochimetric" to --stochiometric--.

Column 12, line 38, change "aluminoferrit" to --aluminoferrite--.

Column 16, line 2, change "th" to --the--.

Signed and Sealed this

Seventh Day of October, 1986

[SEAL]

Attest:

DONALD J. QUIGG

*Attesting Officer*          *Commissioner of Patents and Trademarks*